United States Patent [19]

Verzella et al.

[11] 4,385,355
[45] May 24, 1983

[54] AUTOMATIC OUTER LOOP CENTERING OF AIRCRAFT INNER LOOP

[75] Inventors: David J. Verzella, Guilford; William C. Fischer, Monroe; Don L. Adams, Fairfield; Stuart C. Wright, Milford, all of Conn.

[73] Assignee: United Technologies Corporation, Hartford, Conn.

[21] Appl. No.: 249,299

[22] Filed: Mar. 30, 1981

[51] Int. Cl.³ .................. G06F 15/50; G06G 7/78
[52] U.S. Cl. .................. 364/434; 244/17.13; 244/177
[58] Field of Search .................. 364/434; 244/17.13, 244/177, 178, 179, 194, 196, 197

[56] References Cited

U.S. PATENT DOCUMENTS

| | | | |
|---|---|---|---|
| 4,004,756 | 1/1977 | Gerstine et al. | 244/17.13 |
| 4,029,271 | 6/1977 | Murphy et al. | 244/17.13 |
| 4,078,750 | 3/1978 | Tomlinson | 244/194 |
| 4,109,886 | 8/1978 | Tribken et al. | 244/178 |
| 4,213,584 | 7/1980 | Tefft et al. | 244/17.13 |
| 4,279,391 | 7/1981 | Adams et al. | 244/17.13 |

*Primary Examiner*—Jerry Smith
*Attorney, Agent, or Firm*—M. P. Williams

[57] ABSTRACT

An aircraft automatic flight control system includes a pair of fast, limited authority inner loop actuators (12, 13) responsive to signals (52-55) indicative of aircraft attitude (68, 69) or other flight parameters such as airspeed (84), the inner loop being recentered by an outer loop actuator (37) responsive to attitude or other aircraft parameter-indicating signals (54, 55). Commands (40) applied to the outer loop are applied in a lagged fashion (58, 59) in opposite direction so as to drive the inner loop actuators (12, 13) back toward the center of their authority. The rate of response of the outer loop (FIG. 2, FIG. 5) is adaptive in dependence upon airspeed (93, 96, 212, 213) and in response to magnitude of inner loop input (101, FIG. 2). An integral gain (41), pulsed (39), open loop drive of the outer loop actuator (37) and outer loop automatic shutdown (38) are disclosed.

5 Claims, 5 Drawing Figures

AUTOMATIC OUTER LOOP CENTERING OF AIRCRAFT INNER LOOP

DESCRIPTION

1. Technical Field

This invention relates to aircraft automatic flight control systems, and more particularly to improvements in providing both short term, limited authority stability and long term, full authority flight path control.

2. Background Art

A traditional form of aircraft automatic flight control system includes two major subsystems for each control axis of the aircraft (such as roll, or yaw). One of these subsystems is frequently called the outer loop since it actually moves the pilot control in the same fashion as if the pilot were moving it, and it does so in a manner which is perfectly visible to the pilot. The outer loop has full pilot authority to control the particular axis involved, but is limited in the rate at which it can exercise the authority, so as to prevent instantaneous hardover situations. The rate limiting of the outer loop will normally provide the pilot an indication that something is wrong, and allow him to provide countermanding inputs through his control mechanisms (stick or pedals, as the case may be). The outer loop of an automatic flight control system may be thought of as providing typical autopilot functions, such as airspeed hold, pitch and roll attitude hold, heading hold and altitude hold. As an example, the cyclic pitch stick of a helicopter controls lateral cyclic pitch of the main rotor blades by right and left motion, thereby to control the roll attitude of the helicopter, and controls longitudinal cyclic pitch of the main rotor blades by fore and aft motions, thereby to control the pitch attitude of the helicopter. The pitch outer loop channel actually drives the cyclic pitch stick fore and aft so that, unless the pilot applies force against a resilient connection mechanism to overcome the outer loop, the cyclic pitch stick fore/aft position will be the same as that dictated by the cyclic pitch outer loop actuator of the automatic flight control system.

The inner loop is provided in a manner that it adds or subtracts actual aircraft attitude commands from the basic commands provided by the outer loop. Typically, a high speed, limited authority (on the order of ±10% of pilot authority) actuator is connected in series with the outer loop mechanisms so that the actual aerodynamic surface position commands made to the aircraft (such as to the cyclic pitch swash plate-controlling mixer of a helicopter) differs by as much as 10% from that established by the outer loop (either the outer loop actuator or the pilot positioning of the stick). Stated alternatively, the action of the inner loop is centered about the outer loop. The system is arranged so that the inner loop does not reposition the outer loop; and action of the inner loop is therefore not reflected in the control stick (or pedals) and is therefore invisible to the pilot. In order to provide short term stability, the inner loop is typically fed information from inertial sensors which relate to the rate of change of the axis-controlling parameter (such as roll rate in the roll inner loop and yaw rate in the yaw inner loop). In contrast, the outer loop is typically fed with information from inertial sensors relating to the parameter involved (such as the vertical gyro pitch axis output and airspeed in the pitch outer loop, and directional gyro in the yaw outer loop).

Systems of this type have acquired a high degree of sophistication. In fact, the wide variety of choices of which sensor signals to use and the manner of applying them permits literally altering the apparent dynamics of the aircraft. For instance, various functions of flight parameter indicating signals may be utilized, such as proportional, integral, rate, lag, washout (lagged rate), and these may be used in various combinations. However, in each case, the signal processing used to control the inner loop and the outer loop must be tailored specifically to suit aircraft dynamics and desired aircraft response. Thus, the combined signal processing in both the inner loop and the outer loop can aggregate to a large amount of hardware or signal processing power. This is further compounded in any case where, for safety reasons, a dual system is employed, such as where two inner loop actuators are utilized and each is responsive to its own, separate inertial (or other) sensors with its own channels of signal processing.

Another problem with systems of this type is that the outer loop must inherently be disposed in proximity with the pilot, since it includes the pilot-manipulable control (e.g. stick, pedals). Therefore, the outer loop actuator must of necessity be located some distance from the principal aerodynamic surface controlling member (such as the swash plate mixer of a helicopter). This results in significant hysteresis in the outer loop control system. The lag between aerodynamic surface response and the command inducing that response can become sufficiently high to induce instability, which can only be overcome by additional signal processing which causes the commands to lead desired response, which further complicates control stability problems.

DISCLOSURE OF INVENTION

Objects of the invention include provision of an improved automatic flight control system for providing both a fast inner loop for limited authority, short term airframe stability and pilot input smoothing and a slow outer loop for full authority, long term flight path control.

According to the present invention, an aircraft automatic flight control system utilizes signals derived from aircraft flight parameter sensors to drive a fast, limited authority inner loop for both short term airframe stability and long term flight path control, the center of the inner loop authority being adjusted by positioning of the outer loop in response to signals indicative of long term flight path control errors. According further to the present invention, a function of the outer loop command signals which reposition the center of authority of the inner loop is applied oppositely to the inner loop so that as the outer loop assumes the desired long term control position, the inner loop is commensurately driven back toward the center of inner loop authority, rather than relying on sensor indications of changes in the airframe flight conditions to provide reduced error signals to the inner loop. In accordance still further with the present invention, the outer loop recentering of inner loop authority is adaptive in dependence on magnitude of outer loop input commands, anticipated outer loop input commands, and flight conditions indicative of the likelihood of anticipated commands. Specifically, the outer loop is provided with a faster response rate in response to high demand indicated by outer loop input, and by rate of change of a parameter related to the outer loop input, and the response may be varied in dependence upon the aircrat being above or below a threshold cruise speed. In still further accord with this aspect of the invention, an aircrat attitude automatic flight control system manifested with a limited authority, high speed inner loop, the authority of which is centered by a full authority, low speed outer loop, is normally operable with a first rate of response, and operates with a higher rate of response in dependence upon the summation of attitude commands and lagged rate of the related attitude.

The invention provides a simple automatic flight control system for an aircraft in which the outer loop serves only to position the authority of a fast, limited authority inner loop. The control over the outer loop can be effected in a manner which practically ignores aircraft dynamics, thereby providing simple signal processing for the outer loop. Since the aircraft is responsive to processed signals derived from flight condition-indicating sensors only through the inner loop, and since the inner loop actuators can be mounted proximally with the aerodynamic surface controlling mechanisms, hysteresis is minimized, better frequency response is realized, and significant phase lags are avoided. Therefore, a stable automatic flight control system is readily implemented with a minimum of control signal processing. The invention also avoids the necessity for flight-parameter related closed loop servoing of an outer loop system, the closed loop command of aircraft condition in response to aircraft sensors being effected through the inner loop. Because the inner loop has a high speed of response, all flight conditions can be accommodated therethrough; because the inner loop has limited authority, there is no danger of airframe hard-over situations. Therefore, loss of the outer loop can leave the pilot with a complete, full authority autopilot system, provided only that he occasionally retrim the outer loop by hand so as to maintain the inner loop sufficiently near its center of authority.

The present invention may be implemented with analog, digital or computerized signal processing, utilizing apparatus and techniques which are well within the skill of the art in the light of the teachings which follow hereinafter. The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
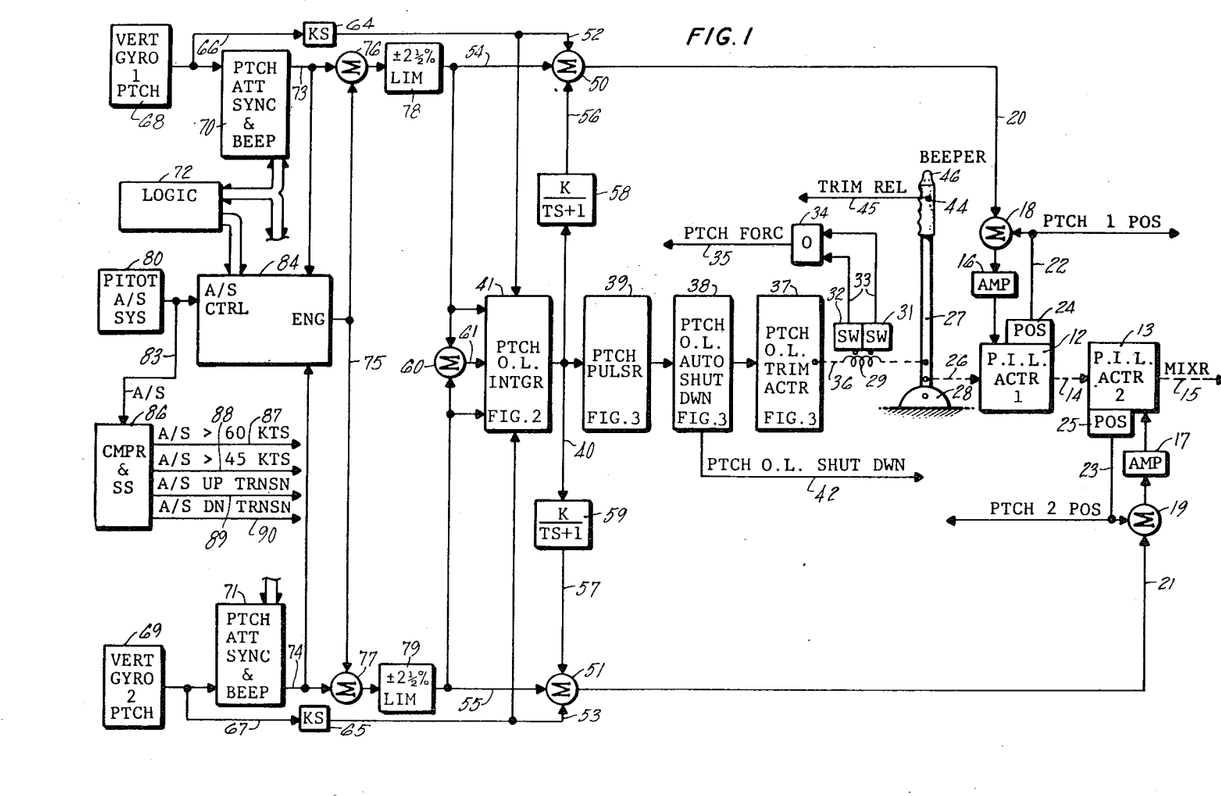
FIG. 1 is a simplified schematic block diagram of the longitudinal cyclic pitch channel of an automatic flight control system in which the present invention may be implemented.

Referring now to FIG. 1, a helicopter longitudinal cyclic pitch control system for controlling the pitch axis attitude of a helicopter, within which the present invention may suitably be implemented includes a pair of inner loop longitudinal cyclic pitch actuators 12, 13 which are connected together by suitable linkage 14 and to a main rotor blade pitch angle swash plate mixer (not shown) by suitable linkage 15. Each of the actuators is driven by a corresponding amplifier 16, 17 in a nulling servo loop fashion. The amplifiers respond to error signals from corresponding summing junctions 18, 19 which provide the amplifiers with a signal indicative of the difference between a pitch command signal on a related line 20, 21 and a signal provided on a related line 22, 23 by a corresponding actuator position sensor 24, 25 which is indicative of the achieved position of the actuator. When the actuators 12, 13 have achieved positions corresponding to the signals on the lines 20, 21 the error signal provided by the summing junctions 18, 19 to the amplifier 16, 17 goes to zero, so the actuators will remain at rest until the signals on the lines 20, 21 are changed (or drift showing up in the lines 22, 23).

The actuators 12, 13 are also connected by mechanical linkage 26 to a cyclic pitch control stick 27 which is pivoted within a gimbal 28 for forward and aft motion against the operation of a trim position spring 29. A pair of switches 31, 32 are disposed on the actuator 37 for detecting motion of the stick 27 against the spring 29 in respective directions. Closure of either switch 31, 32 will provide a signal on a corresponding one of two lines 33 to cause an OR circuit 34 to provide a pitch force signal on a line 35. In various embodiments, the OR function provided by the circuit 34 may simply be implemented by the relationship of the switches 31, 32, as is known in the art.

The cyclic pitch stick 27 is connected by mechanical linkage 36 and the spring 29 to a pitch outer loop trim actuator 37 which is driven through pitch automatic shutdown circuits 38 and pitch pulser circuits 39 by a signal on a line 40 provided by a pitch outer loop integrator circuit 41. These circuits serve to reposition the cyclic pitch stick 27 to a position indicative of the actual commands being provided to the linkage 15 as a consequence of motion of the actuators 12, 13. The pitch auto shutdown circuit 38 provides a pitch outer loop shutdown signal on a line 42. The cyclic pitch stick 27 has a switch 44 that can be closed by a thumb or finger so as to provide a trim release signal on a line 45. The stick 27 also has a "coolee hat" type of four-axis beeper switch 46 that can be moved forward or aft (or right or left) to provide beep signals; in a system of the type described, the beep signals are signals which provide small changes in the attitude reference signals.

The attitude command signals on the lines 20, 21 are each provided by a corresponding summing junction 50, 51, which sum together corresponding pitch rate signals on lines 52, 53, pitch attitude and A/S control signals on lines 54, 55 and outer loop compensation signals on lines 56, 57. The outer loop compensation signals are provided by lag amplifiers 58, 59 which are driven by the output of the pitch outer loop integrator on the line 40.

The signals on the lines 52–55 are applied to the pitch outer loop integrator 41 in order to detect high pitch attitude demand changes. The pitch attitude signals on the lines 54 and 55 are applied to a summing junction 60, the output of which is applied to the pitch outer loop integrator 41 on a line 61.

The signals on the lines 52, 53 are provided by differentiators 64, 65 from gyro pitch signals on lines 66, 67 which are provided by the pitch axis outputs of corresponding vertical 68, 69. The signals on the lines 66, 67 are also compared with attitude reference signals in pitch attitude synchronizing and beep circuitry 70, 71. When the circuits 70, 71 are synchronized, the reference follows (is made equal to) the signal on the corresponding lines 66, 67 indicative of actual pitch angle of the helicopter; when beeping is employed, the reference is forced to equal a greater or lesser pitch angle; when the circuits 70, 71 are not synchronized, they provide pitch error signals on related lines 73, 74 indicative of the variance between the actual pitch angle of the helicopter and the reference helicopter pitch attitude. Logic circuits 72 are connected with the pitch attitude synch and beep circuits 70, 71 to control the operation thereof. In systems of the type disclosed herein, the signals on the lines 73, 74 are summed with a signal on a line 75 in corresponding summing junctions 76, 77, the resultant of which is applied to a related limiter circuit 78, 79 so as to provide the pitch attitude and airspeed control signals on the lines 54, 55 limited to 2½% of total pilot authority. Thus, the short term automatic attitude control which can be provided by means of the actuators 12, 13 is limited to ±5% (total, 10%) of total pilot authority.

A pilot-static airspeed system 80, of any suitable well known type, provides an airspeed signal on a line 83 to airspeed control circuits 84. The airspeed control circuit 84 may also respond to the pitch attitude error signals on the lines 73, 74 so as to provide, over the line 75, increased gain in attitude control when the airspeed control circuitry 84 is engaged. The airspeed signal on the line 83 might be utilized in circuitry 86, which includes compare circuits and single shot circuits (monostable multi-vibrators), or other signal transition detecting circuits, to provide signals on a plurality of lines 87–90 indicative of airspeed being greater than 60 knots or 45 knots, or transitions from below 40 knots to above 40 knots, and transitions from above 45 knots to below 45 knots, respectively. This circuitry may be of the type disclosed in U.S. patent application of Clelford et al, Ser. No. 176,832, filed on Aug. 8, 1980, or may be of other types of hardware or software.

The airspeed control circuits 84 and logic circuits 72 are described in detail in a commonly owned copending U.S. patent application entitled Retaining Airspeed Hold Engagement, Ser. No. 249,268, filed Mar. 30, 1981 by Adams et al.

Figure 2:
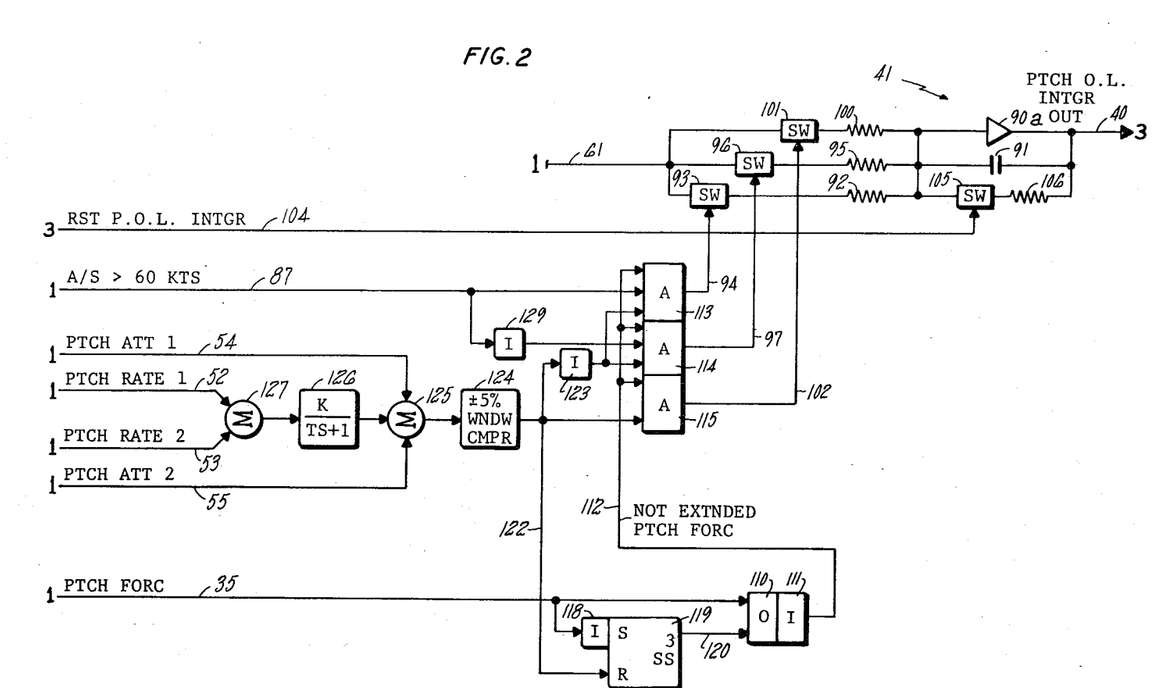
FIG. 2 is a simplified schematic block diagram of a pitch outer loop integrator and control circuits therefor, for use in the system of FIG. 1.

The pitch outer loop integrator 41 is illustrated in detail in FIG. 2. The pitch outer loop integrator 41 comprises an amplifier 90a with a feedback capacitor 91 which forms an integrator, having an effective time constant in dependence upon the value of input resistance connected thereto. In the general case, a first resistor 92 is connected between the output of the summing junction 60 (FIG. 1) on a line 61 and the input of the integrator 41 by a switch 93 which is operated by a signal on a line 94 in response to the airspeed being greater than 60 knots. A second resistor 95 is connected by operation of a switch 96 in response to a signal on a line 97 when the airspeed is less than 60 knots. The resistor 95 may be somewhat less than the resistor 92 so as to provide a faster effective time constant of the integrator 41 at airspeeds above 60 knots than at airspeeds below 60 knots. This allows the outer loop to track somewhat more quickly (in a manner described hereinafter) at higher airspeeds than at lower airspeeds. And, a resistor 100 which is an order of magnitude lower than the resistors 92, 95 may be connected by a switch 101 in response to a signal 102 indicative of a high demand (rapid change in pitch attitude) condition. The integrator 41 is normally reset: for each step-wise movement of the pitch outer loop trim actuator 37; whenever the aircraft is on the ground; during trim release; and whenever the pitch outer loop channel is shut down; all as is described more fully with respect to FIG. 3 hereinafter. The reset function is in response to a reset pitch outer loop integrator signal on a line 104 which causes a switch 105 to place a moderately small resistor 106 in parallel with the capacitor 92 so as to cause it to discharge fully in about 10 milliseconds.

Whenever the pilot provides an input (that is, sufficient force to cause one of the switches 31, 32 to close) and thereby provides the pitch force signal on the line 35, the input to the pitch outer loop integrator 41 is opened so that the integrator holds its present value. This is achieved by providing the pitch force signal on the line 35 to an OR circuit 110 which operates an inverter 111 thereby removing an enabling signal on a line 112 which is applied to a plurality of AND circuits 113–115 so that all of the switches 93, 96, 101 are open. And, whenever the pitch force signal disappears from the line 35, an inverter 118 activates the set input of a 3 second resettable single shot 119 so as to provide a 3 second pulse on a line 120 to the OR circuit 110 so as to continue to inhibit the signal on the line 112 by means of the inverter 111 for an additional 3 seconds. But, if a high demand condition exists, as indicated by a signal on a line 122, the single shot 119 is immediately reset so that the enabling signal on the line 112 can appear immediately. The high demand signal on the line 122 is provided to the AND circuit 115 and through an inverter 123 to the AND circuits 113, 114, thereby to ensure that the switch 101 will be closed and the switches 93 and 96 will be open during periods of high demand. The high demand signal on the line 122 is generated by a window comparator 124 which has reference voltages therein equivalent to +5% and −5% of full pilot authority. The comparator 124 is fed by a summing junction 125 which sums the pitch attitude signals on the lines 54 and 55 with the output of a lag amplifier 126. The lag amplifier 126 is responsive to the output of a summing junction 127 that provides a signal as the summation of the pitch rate signals on the lines 52, 53. Thus, when the limited pitch attitude error and pitch rate of both channels exceeds 5% of pilot authority, a high demand condition is sensed that allows the pitch outer loop integrator to have a lower time constant so that it will (in a manner described with respect to FIG. 3) step the pitch outer loop trim actuator 37 at a faster rate to follow the high demand. For instance, when a pilot desires to make an altitude change and adjusts the collective pitch stick, the coupling (principally aerodynamic) between the collective pitch and pitch attitude axes of the aircraft causes significant pitch attitude changes; for instance, an increase in collective pitch causes the helicopter to nose up rapidly. In this situation, the pitch rate (increasing negatively) is in the same phase with the attitude (negative) and serves to speed up the process of getting into the high demand mode. The faster time constant created by the high demand signal on the line 122 causes inputs on the line 61 to be integrated more quickly. This is equivalent to having airspeed and attitude command signals on the line 61 which are higher than they actually are. The pitch rate signals are, however, principally provided in order to avoid "tuck over" situations when coming out of turns. When in a turn, the pilot pulls the nose up (aft, minus) to maintain altitude. When coming out of the turn and resuming a "wings level" situation, the pilot pushes the nose down (forward, plus) and then lets go of the stick. The pitch attitude, while still positive, is decreasing at a high rate as the helicopter returns to the pitch trim attitude corresponding to the position of the stick. This is an aerodynamically self-correcting situation which will automatically alleviate in a very short time if left alone. Because the rate of pitch attitude command (decreasing) is opposite to the pitch attitude command (positive) at this point of the maneuver, and because the rate of pitch attitude command is likely to be high even though the pitch attitude command is relatively low, the rate of signals could be high enough to overcome the command signals and still have a sufficient magnitude to trigger the comparator 124 and institute the high demand mode. This causes fast integration of the relatively small attitude signals which is equivalent to having high attitude command signals in the forward direction on the line 61. The rapid integration thus pushes the nose down still further and a dive can ensue very quickly. In some cases, the effect can be noncompensable. The lag amplifier 126 delays the rate signal sufficiently so that the initially high rate contribution, which can be greater than the attitude contribution, is reduced, but the relatively lower rate as the attitude settles, is sufficient to inhibit the positive attitude from inducing high demand as described hereinbefore.

The AND circuit 113 normally responds to an airspeed greater than 60 knots signal on the line 87 (when present) to provide the signal on the line 94, and when the airspeed greater than 60 knots signal is not present on the line 87, an inverter 129 will normally cause the AND circuit 114 to provide the signal on the line 97.

Figure 3:
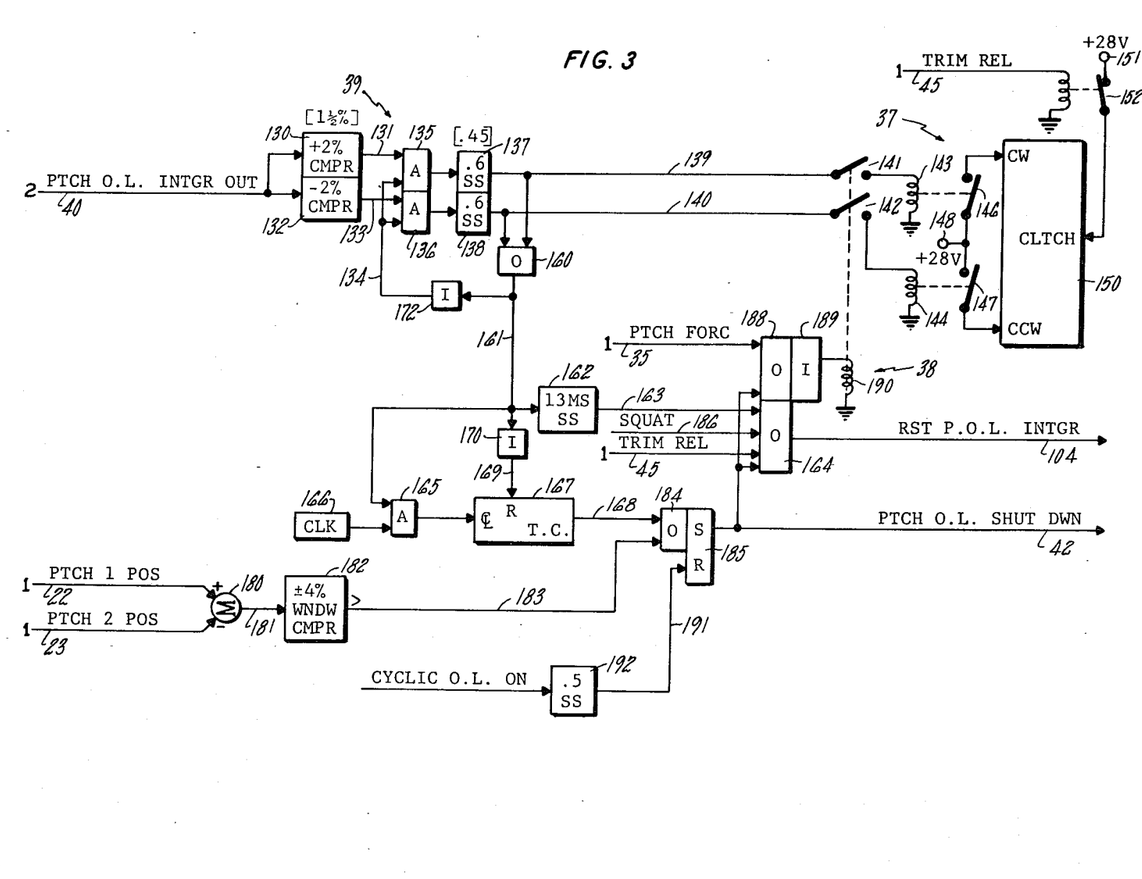
FIG. 3 is a simplified schematic block diagram of pulser, shutdown and trim actuator control circuits for use in the system of FIG. 1.

The pitch pulser 39, pitch outer loop automatic shutdown circuits 38 and pitch outer loop trim actuator 37 are illustrated in detail in FIG. 3. Whenever the summation of limited pitch attitude commands on the lines 54, 55 (FIG. 1) provided on the line 61 by the summing junction 60 are other than zero, the pitch outer loop integrator 41 will integrate those signals (assuming presence of correct control signals described with respect to FIG. 2). If the signals are consistently in the same direction (forward or aft), the pitch outer loop integrator output signal on the line 40 will eventually reach a magnitude equivalent to 2% of full pilot authority in either the forward direction or the aft direction. If in the forward direction, this will cause a comparator 130 (which includes a reference voltage equal to +2% of pilot authority) to provide a signal on a line 131. If in the aft direction, it will cause a comparator 132 (which includes a reference voltage equivalent to −2% of full pilot authority) to provide a signal on a line 133. In the normal case there is also a signal on a line 134 so that a related one of a pair of AND circuits 135, 136 will initiate a corresponding 6/10 of a second single shot 137, 138 to provide a pulse on a corresponding line 139, or 140. Assuming that a pair of normally open contacts 141, 142 are closed, a related relay coil 143, 144 will be energized. This will cause a corresponding normally open contact 146, 147 to close and apply power from a normal source 148 (such as ±28 volts) to either a clockwise or counterclockwise input of a rotary actuator 150 which can move the cyclic pitch stick 27 (FIG. 1) in either direction through the spring 29. The actuator 150 is also provided with a clutch which releases the linkage 36 (FIG. 1) from the movable armature of the actuator whenever a clutch engage input powered from a suitable source 151 is removed by opening the normally closed relay contact 152. One example of this type of rotary actuator is Model No. R4610M23-1 available from Plessey Dynamics Corp., Hillside, New Jersey. Of course, other rotary and linear actuators (either electrical or hydraulic, in suitable cases) may be utilized wherever any implementation of the invention warrants it.

The generation of a pulse on either of the lines 139, 140, as a consequence of the integrating in either the forward or aft direction of the extent of 2% of pilot authority, will cause an OR circuit 160 to provide a signal on a line 161 indicative of the actuator having had one step-inducing pulse applied thereto. The foremost-function of the signal on the line 161 is to activate a 13 millisecond single shot 162 to provide a pulse on a line 163 which, through an OR circuit 164 provides the reset pitch outer loop integrator signal pulse on the line 104. In FIG. 2, this activates the switch 105 and causes resetting of the pitch outer loop integrator 41. Thus, each time that the total pitch attitude command has integrated to 2% of pilot authority, the actuator 150 is stepped one increment, and the integrator 42 is reset.

In order to ensure that neither of the single shots 137, 138 get locked on in a hard-over situation, thereby to continuously drive the actuator 150 and push the cyclic pitch stick in one direction or the other continuously, a one second alarm timer is provided. This includes, in the sample herein, an AND circuit 165 responsive to each pulse on line 161 to pass signals from a clock circuit 166 to a resettable counter 167 at a rate such that it will reach a terminal count and provide a signal on a line 168 in about one second, unless a signal is applied to its reset input on a line 169 by an inverter 170 in response to the signal on the line 161 (indicating absence of both of the pulses on lines 139 or 140) prior to reaching its terminal count. Because leading edge detecting single shots 137, 138 are utilized, it is possible that the rate of integration could be sufficiently fast so as to provide an output from one of the comparators 130, 132 a second time within 6/10 of a second of a first time of providing such an output. Thus one of the AND circuits 135, 136 could provide a voltage level shift into the related single shot 137, 138 during the period of time while the single shot is still timing out. In such a case, that occurrence would be lost and would not cause a corresponding second pulse on one of the lines 139, 140 so that the position of the actuator 150 would begin to lag the desired position. Since this occurrence also prevents a reset of the integrator, the trip level is not crossed again. It could cause no further pulse for some period of time (until integrator output decreased below the 2% comparator level), so that the outer loop would not catch up to the inner loop as desired. To avoid this situation, the signal on the line 161 is passed through an inverter 172 so as to block the AND circuits 135, 136 during the period of time-out of either of the single shots 137, 138. Then, when the 6/10 of a second pulse ends on either of the lines 139, 140 the inverter 172 will again provide the signal on the line 134 causing one of the AND circuits 135, 136 to provide a level shift at the input of the related single shot 137, 138 and thus provide the desired pulse on one of the lines 139, 140. Thus the pulses on the lines 139, 140 may lag up to about 6/10 of a second the firing of one of the comparators 130, 132 without losing the occurrence of the pulse altogether. In an examplary embodiment of the invention, the circuitry may be arranged so that with the high demand signal present on the line 122 (FIG. 2), with a full 5% of authority (the summation of the 2½% limited pitch attitude commands on the lines 54, 55, FIG. 1) the integrator will reach the 2% of authority necessary to cause a pulse in about 0.67 second. This yields about 3.0% per second, and about 2% per pulse.

As illustrated in FIG. 1, the automatic control over pitch attitude is effected by means of the pitch inner loop actuators 12, 13 which add and subtract mixer inputs from a nominal position established by the position of the outer loop (the cyclic pitch stick 27 and the pitch outer loop actuator 37). If one of the pitch inner loop actuators 12, 13 (or the circuitry providing commands thereto) fails or has a significant gain change, the other actuator will, within the limits of the system, provide sufficient inputs to the mixer to largely offset those provided by the failed actuator. This is called an "on/on" type of system, where one actuator normally supplies only half of the input. Most pitch inner loop actuator faults will be of the type occurring either within the actuator (whether the actuator becomes open and cannot move or exhibits a hard-over condition driving to one of its stops) and, faults could occur in the closed servo loop (those portions shown to the extreme right in FIG. 1). Therefore, since the particular failure or the nature of it cannot be determined without the addition of complex diagnostic apparatus, it must be assumed that the pitch attitude signals trying to drive both actuators will reflect the fact that one of them is hard-over, so that the aircraft attitude is lagging the commands, causing large inputs to the outer loop centering system. Thus, if a failure of one of the actuators occurs, the signals feeding the outer loop centering system will cause the outer loop centering system to tend to track the failed actuator, making things even worse.

To avoid having the outer loop centering system track a failed inner loop actuator, the actuator position signals on the lines 22, 23 are subtracted in a summing junction 180 and a signal indicative of the difference between the two actuator positions is applied on a line 181 to a window comparator 182 having reference voltages therein equivalent to ±4% of full pilot authority. Therefore, should the pitch actuator positions differ by more than 4% of pilot authority, the window comparator 182 will provide a signal on a line 183 which will cause an OR circuit 184 to set a pitch outer loop shutdown bistable device 185 and thereby provide the pitch outer loop shutdown signal on the line 42. The bistable device 185 can also be set through the OR circuit 184 by the signal on the line 168 indicative of the fact that one of the six-tenths second single shots 137, 138 has failed in the ON condition.

The pitch outer loop shutdown signal on the line 42 is applied to the OR circuit 164 and therefore will cause resetting of the pitch outer loop integrator as a consequence of the signal on the line 104, in a manner described with respect to FIG. 2 hereinbefore. The OR circuit 164 will also cause resetting of the pitch outer loop integrator whenever the aircraft is on the ground, as indicated by a squat signal on a line 186, and whenever trim release is depressed, as indicated by the signal on the line 45.

The pitch outer loop shutdown signal on the line 42 is also applied to an OR circuit 188, along with the pitch force signal on the line 35, to cause an inverter 189 to cease to provide current to a relay coil 190, thereby causing the contacts 141, 142 to open, so that any pulses on the line 139, 140 will be foreshortened at the actuator 37, and no further pulses can be applied. Of course, with the pitch outer loop integrator in the continuously reset state as a consequence of the signal on the line 104, which is also caused by the pitch outer loop shutdown signal 42, there could be no further pulses generated on the lines 139, 140 during pitch outer loop shutdown. And, whenever the contacts 141, 142 are opened as a consequence of the pitch force signal on the line 35, the pitch outer loop integrator input is open as a consequence of the inverter 111 (FIG. 2) as described hereinbefore. The pitch outer loop shutdown bistable device 185 is reset by a half-second pulse on a line 191 from a single shot 192 whenever the cyclic pitch outer loop function is turned on, which normally will include both the longitudinal cyclic pitch (pitch) and lateral cyclic pitch (roll) outer loop channels.

Figure 4:
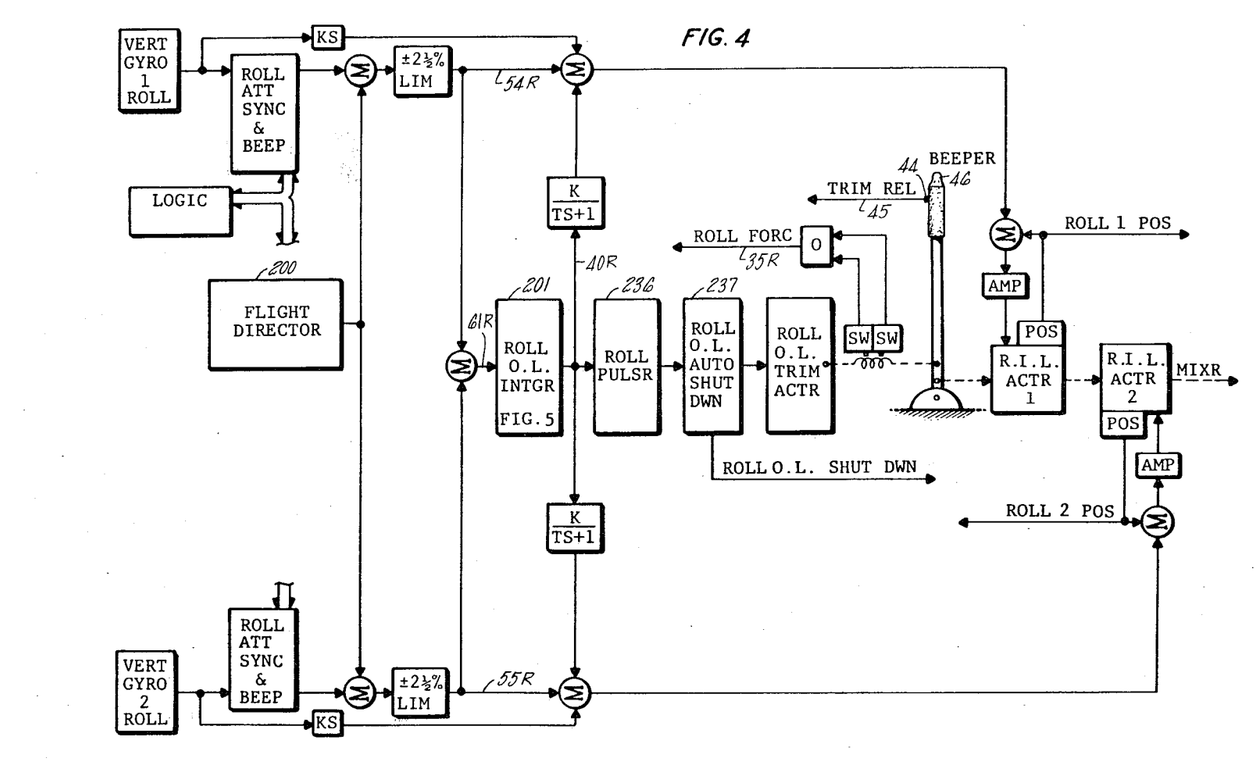
FIG. 4 is a simplified schematic block diagram of a lateral cyclic pitch channel of an aircraft automatic flight control system in which the present invention may be implemented.

An exemplary roll system employing automatic outer loop centering of inner loop controls is illustrated briefly in FIG. 4. This system is essentially identical to the pitch system described with respect to FIG. 1 hereinbefore, except for the absence of airspeed controls 84 (FIG. 1). The roll channel may have a flight director 200 (or other automatic roll steering director). In FIG. 4, the signal lines specifically referred to in the description of a roll outer loop integrator 201 with respect to FIG. 5, hereinafter, retain the same reference numerals as the corresponding pitch channel lines of FIG. 1, but with the suffix "R".

Figure 5:
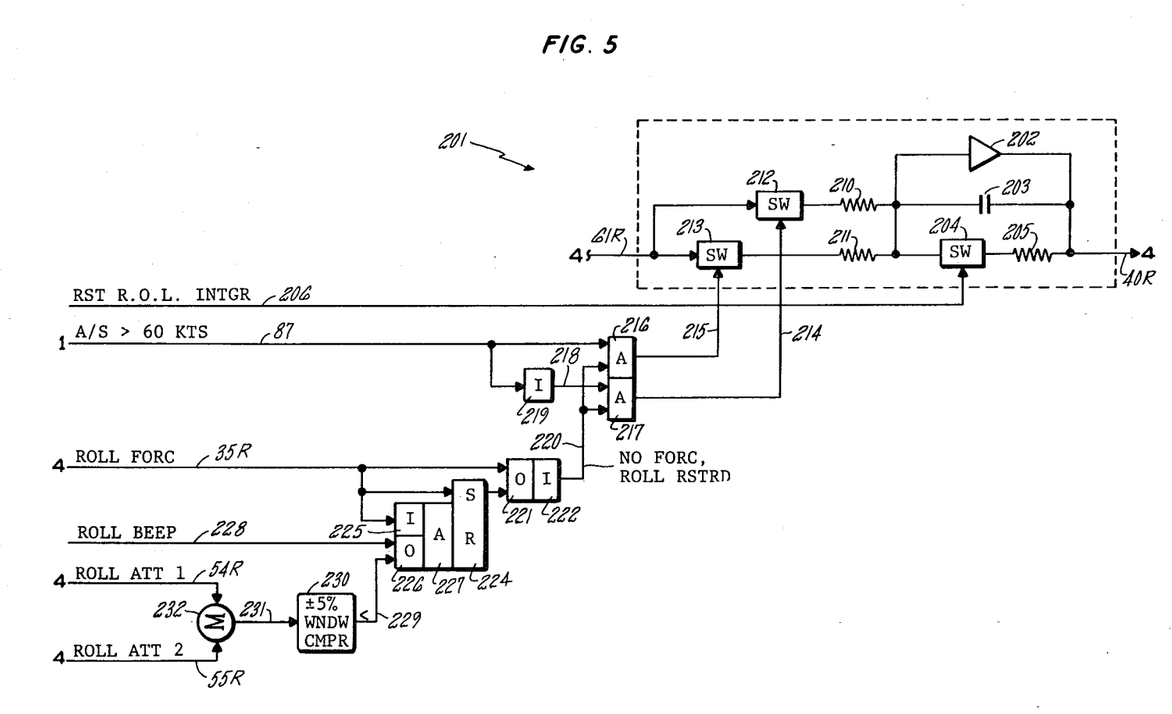
FIG. 5 is a simplified schematic block diagram of a roll outer loop integrator and controlling circuits therefor, for use in the system of FIG. 4.

In FIG. 5, the roll outer loop integrator 201 includes an amplifier 202 having a feedback capacitor 203 which may be reset by closure of a switch 204 to discharge the capacitor 203 through a resistor 205. The switch 204 is closed by the presence of a reset roll outer loop integrator signal on a line 206, which signal is generated in a commensurate fashion to the generation of the reset pitch outer loop integrator signal on the line 104, as described hereinbefore. The gain, and therefore the equivalent time constant for integration of the roll outer loop integrator 201 may be adjusted by selecting the desired input resistor 210, 211 by means of related switches 212, 213 which are activated by signals on lines 214, 215 from AND circuits 216, 217, respectively, operable when airspeed is above 60 knots as indicated by a signal on the line 87, or when it is below 60 knots as indicated by a signal on a line 218 provided by an inverter 219. Thus a slight change in integrating rate as a function of airspeed is provided in the roll outer loop integrator 201 in a fashion similar to that provided in the pitch outer loop integrator 41, as described hereinbefore. Both of the AND circuits 216, 217 can be blocked by the absence of a signal on a line 220, which signal is normally indicative of the absence of pilot stick force in the roll direction. Whenever the pilot does apply lateral force on the cyclic pitch stick 27, the roll force signal on the line 35R causes an OR circuit 221 to provide an input to an inverter 222 that causes the signal on the line 220 to go low. Therefore, the input to the roll outer loop integrator 201 becomes open. The signal on the line 35R also sets a bistable device 224 so that even after the lateral force on the cyclic pitch stick is removed, and the signal on the line 35R disappears, the set side of the bistable device 224 will pass a signal through the OR circuit 221 to maintain operation of the inverter 222, which causes the input of the roll outer loop integrator 201 to continue to be open. Therefore, even though force is removed, so that the roll outer loop trim actuator is connected to the pulsers (equivalent to the contacts 141, 142 in FIG. 3) there can be no change in the integrator so long as the bistable 224 is set. Because of an inverter 225, the bistable device 224 cannot be reset so long as force is applied. But once the input force signal on the line 35R disappears, then the operation of an OR circuit 226 will cause an AND circuit 227 to apply a signal to the reset side of the bistable device 224 and cause it to reset. The OR circuit 226 is responsive to either a roll beep signal on a line 228, which is provided in a straightforward way by sensing closure of either of the lateral switches in the beeper 46 (FIG. 4). The OR circuit 226 can also be operated by a signal on a line 229 from a window comparator 230 having reference voltages therein equal to plus and minus 5% of pilot authority. The window comparator 230 in turn responds to a signal on a line 231 which represents the total roll attitude command as indicated by signals on the lines 54R, 55R provided to a summing junction 232. Thus, once the pilot applies lateral force to cyclic pitch stick, the outer loop will no longer recenter the roll input to the mixer until the stick is released and either the aircraft returns to nearly its reference roll attitude position (as indicated by low roll attitude input commands), so the inner loop is no longer saturated and can again be trimmed by the outer loop. But, if the pilot beeps the system in roll, the outer loop is restored to recenter the inner loop at the new reference.

Referring again to FIG. 4, the roll pulser circuits 236 are the same as the pitch pulser circuits 39 described in FIG. 3 except they may have a 1½% comparators 130, 132 and the length of the pulse might be reduced to 0.45 second in the single shots 137, 138, resulting in 1½% trim correction per pulse. Roll outer loop shutdown circuits 237 could be essentially the same as the pitch outer loop automatic shutdown circuits 38 as illustrated in FIG. 3 except for commensurate conversion to roll-related signals in place of specifically pitch-related signals. And, the remaining roll outer loop actuator apparatus may be substantially identical to that described with respect to the pitch channel in FIGS. 1–3 hereinbefore.

The present invention is exemplified in FIG. 1 and FIG. 4. The details of the particular implementation, as shown in FIGS. 2, 3 and 5 are not required for the practice of the invention. The concept of a pulsed, rotary, clutched and braked electric actuator, which allows total open loop operation without any drift, is more particularly set forth and claimed in a commonly owned copending U.S. patent application entitled PULSED AIRCRAFT ACTUATOR, Ser. No. 249,300, filed Mar. 30, 1981 by Fischer et al. The present invention may also be practiced utilizing simple hydraulic actuators, simple AC or DC rotary or linear (jackscrew) actuators and the like, provided only that some provision is made for long term drift of such systems. As an example, the drift may be accommodated by a simple servo loop (such as that shown for the inner loop actuators) to maintain a desired commanded position. On the other hand, an open loop system could be utilized, with auto-synchronizing between the inner loop and the outer loop performed in a manner analogous to that disclosed and claimed with respect to an airspeed/attitude system in the commonly owned, copending U.S. patent application entitled NON-SATURATING AIRSPEED/ATTITUDE CONTROLS, Ser. No. 249,302, filed Mar. 30, 1981 by Verzella et al. In such a case, sensing that the inner loop actuators have achieved some percentage (such as 80%) of their authority in either direction could cause a specific, opposite corrective command to be summed into the input of the pitch outer loop integrator, which would drive the outer loop in the direction in which the inner loop actuators are reaching full authority, and the lagged outer loop input to the inner loop on lines 56, 57 would move the inner loop actuators back toward the center of their authority, in a fashion described hereinbefore.

The disclosed embodiment employs integral gain (41) of the outer loop command (61), but the invention may be also practiced utilizing a combination of integral and proportional gain, or, where suitable and permissible, simply proportional gain.

The invention provides an adaptive outer loop recentering of the inner loop. At cruise airspeeds (above 60 knots) the outer loop is caused to respond more quickly than at low airspeeds (or hover, in a helicopter). Similarly, when high demand is indicated (by the signals on the lines 54, 55) or anticipated (by the signals on the lines 52, 53), the outer loop has a higher rate of response. In the exemplary embodiment, these adaptive rates of response are implemented by adjusting the effective time constant of the pitch outer loop integrator (FIG. 2, FIG. 5).

The disclosed embodiment includes providing to the inner loop, a lagged function (by amplifiers 58, 59, FIG. 1) of the outer loop command. As the integrator output builds up, the amplifiers 58, 59 drive the outer loop in the desired-response direction (in phase with the commands on lines 54, 55). As the integrator is reset, the fall in the integrator output causes a command component through the amplifiers 58, 59 to command the actuators back by 2% of authority (opposite to the desired-response commands), just as the outer loop steps forward by 2% of authority. Thus, the inner loop actuators 12, 13 are actually driven back toward their center positions commensurately with the outer loop assuming the authority from the inner loop. Stated simply, for each increment of command put into the outer loop, a corresponding increment of command is taken away from the inner loop. However, if the lagged outer loop command is not provided to the inner loop, the same effect would be achieved by adjustments in the aircraft attitude. For instance, for each pulse on the line 40, the outer loop would have an input command to the mixer in the same direction as that in which the inner loops had previously provided a command. This would cause the attitude of the aircraft as sensed by the vertical gyro (68, 69) to be different from the desired attitude as established by the attitude reference signals in the circuit 70, 71. This would cause a countermanding input over the lines 52-55 which would drive the inner loop back toward its centered position in a fashion to remove from the mixer linkage 15 the same amount of input as was applied thereto by movement of the outer loop linkage 36, 26. Thus the system will provide automatic centering of the inner loop in response to outer loop changes through the attitude response of the aircraft itself. The provision of the lag amplifiers 58, 59 simply takes out the requirement for aircraft attitude changes to achieve commensurate centering of the inner loop, causing the attitude of the aircraft to remain substantially constant, or smoothly transitioning, rather than having abrupt attitude changes to accommodate recentering of the inner loop in a pulse fashion. In a linear, nonpulsed version of the present invention, the recentering as a consequence of aircraft attitude (without the outer loop input to the inner loop) would be smoother, but would add additional dynamic stability complexity to the circuitry. Of course, the invention may be practiced with single or triplex inner loops, with dual outer loops, etc.

The foregoing description is in simplified block form, the detailed circuitry being described with respect to simple positive logic utilizing either relay contacts or switches to open and close certain paths, summing junctions (which are understood to be combinations of resistors at the correct inverting and noninverting inputs of suitable amplifiers) single shots which may require reset dominance or may not need one, bistable devices, and the like. Many of the foregoing functions can obviously be achieved in a simpler fashion by using more true and complement outputs and fewer inverters; in many instances the positive logic disclosed may readily be reworked into inverting logic to be more suitably applicable to available hardware chips. The description is, therefore, principally in terms of function achieving blocks, and it should be understood that numerous variations may be utilized for achieving the same or equivalent functions and combinations of functions within the skill of the art. In addition, the functions of the foregoing apparatus (other than the mechanical functions and those functions which directly interface with the mechanical functions) may readily be implemented by utilization of a suitably programmed digital computer. The conversion of the discrete and analog functions described herein to digital functions performed by suitable software in a computer is well within the skill of the art, particularly in the light of the teachings of equivalency set forth in a commonly owned copending U.S. patent application, Ser. No. 176,832, filed on Aug. 8, 1980 by Clelford et al.

The invention may be practiced in automatic flight control systems having single channels of inner loop or of outer loop, dual channels of inner loop or of outer loop, or more channels of either, in various combinations. The exemplary conditions, magnitudes, durations and relationships may of course be varied to suit any usage of the invention. Aspects of the invention may be practiced in automatic control of various functions, in addition to the illustrative functions described herein.

Similarly, although the invention has been shown and described with respect to an exemplary embodiment thereof, it should be understood by those skilled in the art that the foregoing and various other changes, omissions and additions may be made therein and thereto, without departing from the spirit and the scope of the invention.

We claim:

1. A system for automatically positioning aerodynamic surfaces in a control axis of an aircraft, comprising:

a sensor responsive to a parameter of aircraft flight related to said control axis for providing a parameter signal indicative of the magnitude thereof;

a fast, inner loop actuator for changing the position of said aerodynamic surfaces across a limited authority range of positions which is a fraction of the total permissible range of positions thereof;

a slow, outer loop actuator connected to said inner loop actuator for adjusting the position of said inner loop actuator relative to the position of said control surfaces throughout a full authority range of positions equal to the total permissible range of positions thereof, to thereby reposition the center of said limited authority range relative to said full authority range; and signal processing means for providing a reference signal indicative of a desired magnitude of said parameter, and responsive to said sensor, for providing to said inner loop actuator a proportional command signal indicative of the magnitude and sense of the difference between said parameter signal and said reference signal to adjust the position of said control surfaces in a first direction, depending on the sense of said difference, to cause said parameter signal to approach equality with said reference signal, and for providing, to said inner loop actuator, a rate command signal indicative of the magnitude and sense of the rate of change of said parameter signal to adjust the position of said control surfaces in a second direction, depending on the sense of said rate of change, to cause the rate of change of said parameter signal to approach nil, for providing to said outer loop actuator an outer loop command signal indicative of the magnitude and sense of the difference between said parameter signal and said reference signal to adjust the position of said inner loop actuator and therefore of said control surfaces in said first direction, and for providing an inner loop recentering signal to said inner loop actuator in dependence on the magnitude and sense of said outer loop command signal but of a sense to adjust the position of said control surfaces in a direction opposite to said first direction by substantially the same amount as said outer loop actuator adjusts the position of said inner loop actuator and therefore of said control surfaces, whereby the position of said inner loop actuator is adjusted to be substantially at the center of said limited authority range without significant perturbation of the position of said control surfaces.

2. A system according to claim 1 characterized by said signal processing means comprising means for providing a first signal indicative of the magnitude of said difference and for providing said outer loop command signal in a manner to adjust the position of said outer loop actuator at a first rate with respect to time in response to said first signal being below a threshold magnitude, and for providing said outer loop command signal in a manner to adjust the position of said outer loop actuator at a second rate with respect to time higher than said first rate in response to said first signal being of a magnitude in excess of said threshold magnitude.

3. A system according to claim 1 characterized by said signal processing means comprising means for providing a first signal indicative of the magnitude of said difference, for providing a second signal indicative of the magnitude of said rate of change of said parameter signal, and for providing said outer loop command signal in a manner to adjust the position of said inner loop actuator at a first rate with respect to time in response to the summation of said first signal and said second signal being below a threshold magnitude, and for providing said outer loop command signal in a manner to adjust the position of said inner loop actuator at a second rate with respect to time higher than said first rate in response to the summation of said first signal and said second signal being of a magnitude in excess of said threshold magnitude.

4. A system according to claim 3 characterized by said signal processing means comprising means for providing said second signal as the lag of said rate.

5. A system according to claim 1 wherein said parameter is attitude of said aircraft with respect to level about a normally horizontal axis thereof, including means to sense the magnitude of airspeed of said aircraft, further characterized by said signal processing means comprising means for providing said outer loop command signal in a manner to adjust the position of said outer loop actuator at a first rate with respect to time in response to said airspeed being below a threshold magnitude, and for providing said outer loop command signal in a manner to adjust the position of said outer loop actuator at a second rate with respect to time higher than said first rate in response to said airspeed being of a magnitude in excess of said threshold magnitude.

* * * * *